(12) United States Patent
Autenrieth et al.

(10) Patent No.: US 6,423,435 B1
(45) Date of Patent: Jul. 23, 2002

(54) FUEL CELL SYSTEM WITH AN ASSIGNED HYDROGEN GENERATING ARRANGEMENT

(75) Inventors: Rainer Autenrieth, Erbach; Andreas Docter, Laupheim; Arnold Lamm, Elchingen; Thomas Poschmann, Ulm; Steffen Wieland, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/517,527

(22) Filed: Mar. 2, 2000

(30) Foreign Application Priority Data

Mar. 2, 1999 (DE) .......................... 199 08 905

(51) Int. Cl.$^7$ .............................................. H01M 8/04
(52) U.S. Cl. ........................................ 429/13; 429/17
(58) Field of Search ............................. 429/12, 17, 19, 429/20, 26

(56) References Cited

U.S. PATENT DOCUMENTS

| | | | |
|---|---|---|---|
| 3,982,962 A | * | 9/1976 | Bloomfield .................. 429/19 |
| 4,365,006 A | | 12/1982 | Baker |
| 4,759,997 A | | 7/1988 | Ohyauchi et al. |
| 5,360,679 A | | 11/1994 | Buswell et al. ............... 429/19 |
| 5,658,681 A | | 8/1997 | Sato et al. .................... 429/13 |
| 6,045,933 A | * | 4/2000 | Okamoto .................... 429/17 |
| 6,120,923 A | * | 9/2000 | Van Dine t al. .............. 429/17 |

FOREIGN PATENT DOCUMENTS

| | | |
|---|---|---|
| DE | 35 37 527 C2 | 2/1985 |
| DE | 40 32 652 A1 | 10/1990 |
| DE | 196 05 404 C1 | 2/1996 |
| DE | 195 35 288 | 3/1997 |
| EP | 0 017 967 | 2/1982 |
| EP | 0 642 182 A2 | 5/1994 |
| JP | 7-135009 | 5/1995 |

OTHER PUBLICATIONS

Copy of the specification and Official Filing Receipt of patent application serial No. 09/659,036 filed on Sep. 11, 2000.

* cited by examiner

*Primary Examiner*—Gabrielle Brouillette
*Assistant Examiner*—Monique Wills
(74) *Attorney, Agent, or Firm*—Crowell & Moring LLP

(57) ABSTRACT

A fuel cell system has at least one fuel cell and a hydrogen generating arrangement for feeding the fuel cell anode with a hydrogen-containing product gas from a conversion reaction of a hydrocarbon starting substance or hydrocarbon derivative with of water fed supplied by way of a water feeding system. Water recovery devices are provided for condensing water out of the process gas supplied by the hydrogen generating arrangement, and/or out of the cathode waste gas carried away from the fuel cell cathode, and returning the condensed-out water into the water feeding system.

7 Claims, 4 Drawing Sheets

FUEL CELL SYSTEM WITH AN ASSIGNED HYDROGEN GENERATING ARRANGEMENT

BACKGROUND AND SUMMARY OF THE INVENTION

This application claims the priority of German patent document No. 199 08 905.1, filed Mar. 2, 1999, the disclosure of which is expressly incorporated by reference herein.

The invention relates to a fuel cell system which includes a hydrogen generating arrangement for feeding the fuel cell anode with a hydrogen-containing product gas by means of a conversion reaction of a hydrocarbon or hydrocarbon derivative, such as gasoline, diesel oil or methanol, with water fed by way of a water feeding system.

Fuel cell systems of this type, with an integrated hydrogen generation system, have been used with increasing frequency in vehicles powered by fuel cells. The starting substance is then preferably carried along in liquid form, and the fuel cells can be operated very effectively by means of hydrogen, without, however, the need for voluminous and heavy hydrogen storage devices.

In a known system, a reforming arrangement is used to generate hydrogen. The starting substance is converted by an endothermal water vapor reforming reaction, which may be combined with a partial oxidation reaction to obtain an autothermal conversion process. In this case, a hydrogen-rich product gas is formed in a corresponding conversion reactor. The product gas, however, frequently still contains carbon monoxide in a proportion which would be damaging to the fuel cell anode. It is therefore known to connect a gas purification stage downstream of the reactor unit, or to integrate the gas purification stage into the reactor unit, for example, in the form of a hydrogen-separating membrane, a CO-oxidation unit for the selective CO-oxidation and/or a water gas shift reactor unit for conversion of carbon monoxide to carbon dioxide by way of a water gas balance reaction.

In the system disclosed in U.S. Pat. No. 4,365,006, the cathode waste gas of a fuel cell is fed to a hydrogen generating reactor, to which a hydrocarbon starting substance or a hydrocarbon derivative starting substance is also fed. The reactor is constructed in two stages (an inlet-side partial oxidation unit and an outlet-side vapor reforming unit), and the product gas that is generated is fed directly, without further gas purification, as a fuel gas into the fuel cell anode. The anode waste gas is utilized in a burner which is used for heating the reactor and an evaporator.

European Patent Document EP 0 642 184 A2 teaches the utilization of the cathode and the anode waste gases of a fuel cell in a catalytic burner for heating a reforming reactor. The latter utilizes a starting substance which is to be reformed (particularly natural gas) to generate a hydrogen-containing product gas that is fed to the fuel cell anode, without further gas purification.

German Patent Document DE 40 32 652 A1 discloses a fuel cell system of the type described above, in which the hydrogen generating arrangement comprises a vapor reforming reactor, which receives a starting substance such as natural gas, for example; a two-stage gas purification stage for CO reduction; a water separator, and a unit for washing out carbon dioxide. The reforming reactor is heated by the flue gas of a burner, which receives at least one portion of the cathode waste gas of the fuel cell as air oxygen supply and a branched off portion of the starting substance to be reformed and/or a portion of the anode waste gas of the fuel cell, as the fuel. A portion of the anode waste gas can also be fed to the first and second gas purification stages, respectively.

In U.S. Pat. No. 4,759,997, the waste gases of a fuel cell cathode and of a heating burner of a reforming unit assigned to the fuel cell are supplied to a catalytic supplementary burner and to drive a turbine by means of its waste gas flow. The turbine is mechanically coupled with a compressor which is used for compressing air fed to the fuel cell cathode and to the burner of the reforming unit.

One object of the present invention is to provide a fuel cell system with an integrated hydrogen generating system of the type descried above, which permits a particularly efficient utilization of water and exhibits good dynamics under fluctuating load conditions.

Another object of the invention is to provide such a fuel cell system with a relatively compact construction.

These and other objects and advantages are achieved by the fuel cell system according to the invention, which includes water recovery devices that condense water out of a process gas supplied by the hydrogen generating arrangement and/or out of the cathode waste gas of the fuel cell cathode. Water received in this manner is returned to the existing water feeding system which supplies water for the conversion reaction of the hydrocarbon starting substance or the hydrocarbon derivative starting substance in the hydrogen generating arrangement.

Recovery of water fed into the hydrogen generating arrangement and/or formed on the fuel cell cathode facilitates optimal water utilization, and thus a water balance. This feature is highly advantageous, particularly for mobile applications (for example, in fuel cell powered vehicles), because the water feeding system (for which there is in this case no tap water connection) requires only a relatively small water tank.

At the same time, the feeding of the one or several fuel cells by means of a hydrogen-containing product gas, which preferably consists of highly pure hydrogen, permits a high efficiency for the fuel cell operation, with good dynamics and compact construction.

In one embodiment of the invention, a water gas shift reactor unit is connected downstream from the conversion reactor unit, and the water feeding system feeds water to the conversion reactor unit and/or the water gas shift reactor unit. The former can be used particularly for carrying out a water vapor reforming reaction of the hydrocarbon or hydrocarbon derivative starting substance, while the feeding of water into the shift reactor unit displaces the water gas reaction equilibrium in favor of an increased CO conversion. Thus, an effective water gas reaction (also called shift reaction) can be used to reduce the CO concentration in the hydrogen-containing product gas. Furthermore, water feeding to the fuel cell cathode may be provided, for example, for cooling purposes.

In another embodiment of the invention, at least one hydrogen-separating membrane is provided in the hydrogen generating arrangement. The hydrogen separating membrane selectively separates the hydrogen-containing product gas from the remaining residual conversion gas, particularly the hydrogen used for feeding the fuel cell anode from carbon monoxide formed during the conversion reaction of the hydrocarbon or hydrocarbon derivative starting substance. Specifically, this gas purification measure can be combined with another gas purification measure, such as a water gas reaction and/or a CO oxidation. Water which may be contained in the unseparated residual conversion gas is condensed out by means of a corresponding condenser, and is therefore available for another use in the system. In addition, a water feeding line leading to the conversion reactor unit may be guided by way of this residual conversion gas water condenser so that in it, the water fed into the conversion reactor unit can be preheated.

In still another embodiment of the invention, the water recovery devices contain two condensers. One is used for condensing water out of a process gas supplied by the hydrogen generating arrangement, while the other is used for condensing water out of the fuel cell cathode waste gas. Furthermore, a common cooling circulation system is provided for the two condensers. In a mobile application in a fuel cell vehicle, the cooling circulation system may have, for example, an air-cooled cooler unit for cooling the circulation coolant. In addition, the cooling circulation system can be used for cooling the fuel cell cathode.

In still another embodiment, the hydrogen generating arrangement includes at least one hydrogen separating membrane for selective separation of the hydrogen-containing product gas from the residual conversion gas, and the water recovery devices contain the residual conversion gas water condenser. One or two heat exchangers are provided, in which the separated hydrogen-containing product gas is in thermal contact with the residual conversion gas downstream of the residual conversion gas water condenser and/or with the cathode waste gas downstream of a cathode waste gas water condenser. (Thermal contact may be provided for condensing water out of the cathode waste gas.) As a result, the separated product gas can be cooled to a desired extent in a simple manner, by the residual conversion gas and/or cathode waste gas already slightly cooled in the preceding condenser.

In a further embodiment of the fuel cell system having a hydrogen generating arrangement containing a hydrogen separating membrane, an expander unit is provided in the residual conversion gas flow. The expander unit causes a relaxation of the residual conversion gas and utilizes the energy thus recovered as mechanical driving energy for a pump unit for delivering and compressing the separated hydrogen-containing product gas to be fed into the fuel cell anode.

In yet another embodiment of the invention, the anode waste gas is apportioned by way of a mixer unit to the hydrogen-containing product gas fed to the fuel cell anode on the input side, and/or it is supplied to the hydrogen generating arrangement, particularly its conversion reactor unit. In this manner, the chemical and thermal energy contained in the anode waste gas is retained for the system.

Finally, still another embodiment of the invention includes a hydrogen generating arrangement equipped with a hydrogen separating membrane. The residual conversion gas which is not separated, together with the cathode waste gas, is catalytically burned in a corresponding burner unit. A burner waste gas expander unit connected downstream of the catalytic burner unit relaxes the burner waste gas and utilizes the recovered mechanical energy to drive a pump unit for feeding cathode air and/or for the feeding air to the hydrogen generating arrangement, particularly to its conversion reactor unit.

Other objects, advantages and novel features of the present invention will become apparent from the following detailed description of the invention when considered in conjunction with the accompanying drawings.

DETAILED DESCRIPTION OF THE DRAWINGS

FIGS. 1 to 4 illustrate examples of various possible implementations of the fuel cell system according to the invention. Functionally identical components, for reasons of clarity, are provided with the same reference numbers throughout.

Figure 1:
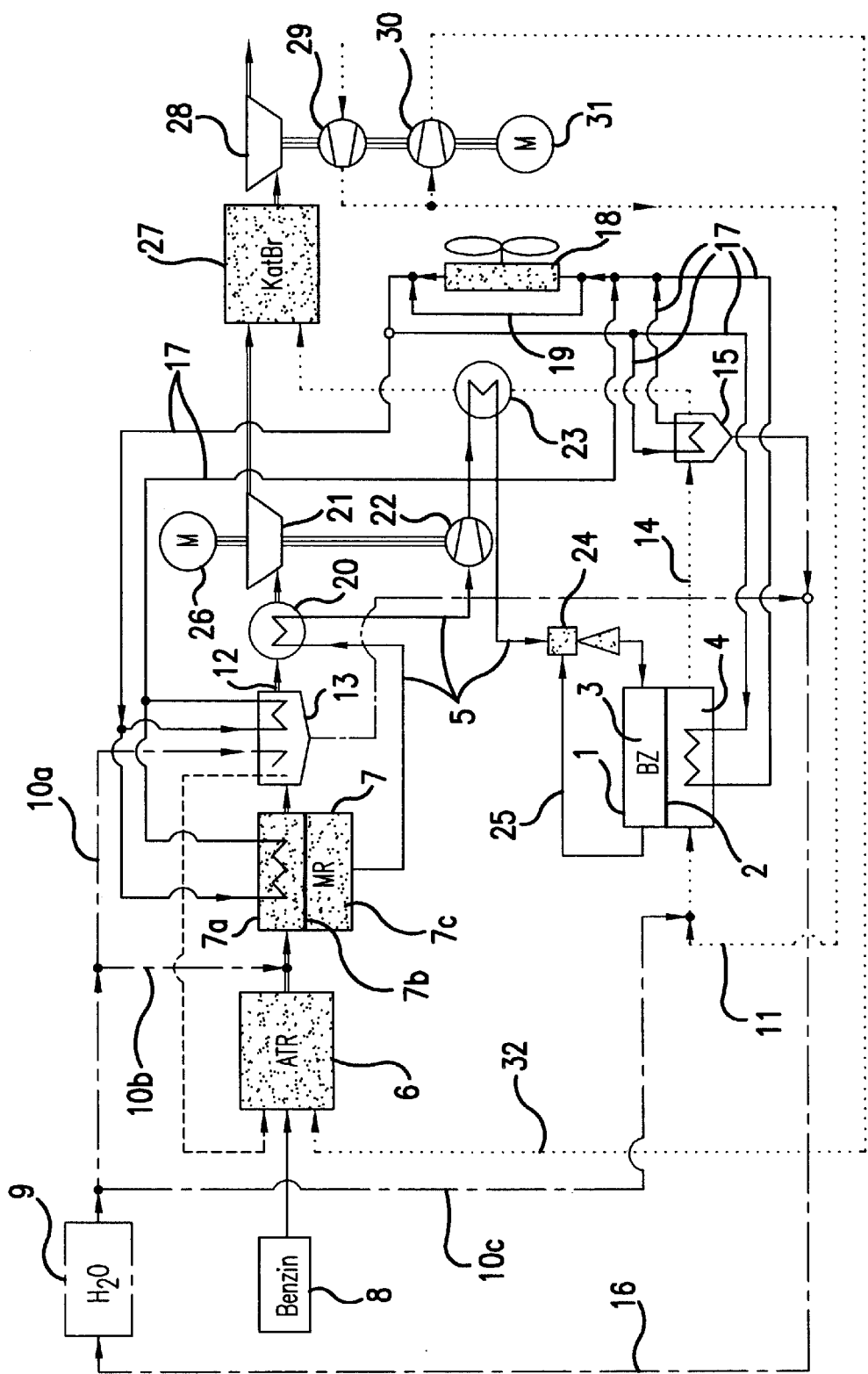
FIG. 1 is a block diagram of a fuel cell system having a hydrogen generating arrangement with an autothermal reactor, and a membrane reactor connected on the output side.

The system of FIG. 1 contains a fuel cell arrangement with one or more fuel cells 1 (one being shown in a representative fashion), each of which in a conventional manner includes a fuel cell anode 3 and a fuel cell cathode 4 which are separated from one another by a fuel cell membrane 2. An assigned hydrogen generating arrangement supplies a hydrogen containing product gas (preferably consisting of a highly pure hydrogen)to fuel cell anode 3 via a product gas line 5.

In the example of FIG. 1, the hydrogen generating arrangement contains an autothermal reactor 6 and a membrane-type reactor unit 7 connected on the output side of the autothermal reactor 6. In the autothermal reactor 6, gasoline stored in a gasoline tank 8 is reacted while additionally feeding water and/or air, at a temperature of preferably between 800° C. and 900° C., by an autothermal reforming reaction or a partial oxidation reaction into a hydrogen-rich raw-product gas. In the reaction space 7a of the membrane-type reactor 7 connected on the output side, the raw-product gas is then subjected to a water gas shift reaction (with additional water apportioned), convert existing carbon monoxide into carbon dioxide, with additional generation of hydrogen. The membrane reactor unit 7 is equipped with a conventional hydrogen separating membrane 7b which separates the shift reaction space 7a from a hydrogen collecting space 7c, from which the product gas line 5 leads out. In this manner, product gas consisting essentially of hydrogen is separated selectively by way of the separating membrane 7b from the shift reaction space 7a. It flows through the hydrogen collecting space 7c to the product gas line 5, which leads it to the fuel cell anode 3.

A water feeding system with closed water circulation contains a water tank 9 in which water is stored, at a temperature of, for example, approximately 60° C. A first water feed line 10a, supplies water to the autothermal reactor 6 (if an autothermal reforming reaction is to take place there), in which an exothermal oxidation reaction is to be combined with an endothermal water vapor reforming, such that a desired temperature is automatically maintained. Alternatively, the conversion reaction for the starting substance (here, gasoline) can be implemented as a pure partial oxidation reaction (with heat carried off), or as a pure water vapor reforming (with heat supplied). For this purpose, a conventional conversion reactor unit is provided, which is in each case appropriately designed and contains a suitable catalyst material. Depending on the desired conversion reaction, water alone, air alone or a mixture of water and air is admixed to the supplied gasoline. As required, an evaporator is connected on the input side of the reactor unit. By way of a second water feeding branch 10b, water is admixed to the raw-product gas on the input side of the membrane reactor 7 in order to shift the reaction balance of the water gas shift reaction in the membrane reactor 7 in favor of an increased CO conversion, with additional generation of hydrogen.

By way of a third water feeding branch 10c, water can be apportioned to the cathode air flow fed by way of a cathode air feed line 11 into the fuel cell cathode 4, for example, for cooling purposes.

In order to achieve optimal water balance, water is recovered from the residual conversion gas which has not been separated by way of the hydrogen separating membrane 7b, as well as from the cathode waste gas leaving the fuel cell cathode 4. For this purpose, a first condenser 13 is provided in a residual conversion gas line 12 leading out of the shift reaction space 7a of the membrane reactor 7; and a second condenser 15 is provided in a cathode waste gas line 14 leading out of the fuel cell cathode 4. The water collected in the residual conversion gas water condenser 13 and in the cathode waste gas water condenser 15 is returned via a water return line 16 into the water tank 9, and is available for further utilization in the system. In the return feed line 16, the water has, for example, a temperature of 20° C. and a pressure of 1 bar. The residual conversion gas water condenser 13 is designed such that, in addition to the pertaining branch of the cooling circulation system 17, it has another flow duct which is in a thermal contact with the warm residual conversion gas. The flow duct connects the water feeding branch 10a to the autothermal reactor 6, so that the water, which is preheated by the residual conversion gas, arrives in this state in the autothermal reactor 6.

A common cooling circulation system 17 which cools the two condensers 13, 15 contains a suitable coolant, such as water, and an air-cooled cooler unit 18 for carrying away heat. A bypass line 19 assigned to the cooler unit 18 guides the coolant past the cooler unit 18 as necessary, via a controllable valve (not shown). The two condensers 13, 15 are cooled by two parallel branches of the cooling circulation system 17, while a third branch of the cooling circulation system 17 cools the fuel cell cathode 4. A fourth branch of the cooling circulation system 17 cools the shift reaction space 7a. For performing a low-temperature shift reaction, the latter is maintained at a temperature of typically less than 350° C., which is significantly lower than that of the autothermal reactor 6. When the system is situated in a vehicle powered by a fuel cell, the cooling circulation system 17 may be part of an engine cooling circulation system and/or of an air conditioner.

A first product gas heat exchanger 20 is connected at the output of the residual conversion gas water condenser 12. In the heat exchanger 20, separated product gas flowing in the product gas line 5 is in a thermal contact with the residual conversion gas cooled by the pertaining condenser 13. The residual conversion gas, thus reheated, is relaxed in an expander unit 21. A product gas pump unit 22 which is connected to an output of the expander unit 21, and is mechanically coupled to the expander unit 21 sucks the separated product gas out of the hydrogen collecting space 7c, and feeds it in a compressed state to the fuel cell anode 3. To the extent that the power of the expander unit 21, is not sufficient to compress the product gas from the pressure in the hydrogen collecting space 7c (for example, typically approximately 0.5 bar) to the pressure desired for the anode feeding (for example, approximately 1.5 bar), the product gas pump unit 22 is driven in a supplementary fashion by a driving motor 26. A second product gas heat exchanger 23 which cools the product gas compressed by way of this pump unit 22 is connected on the output side of the pump unit 22. Therein, the compressed product gas is in thermal contact with the cathode waste gas cooled in the pertaining condenser 15. The product gas, thus cooled again, is then fed to a mixer unit 24, where the fuel cell anode waste gas is apportioned to it by way of an anode waste gas return line 25. The latter feeds the resulting fuel gas mixture (largely of hydrogen), into the fuel cell anode 3.

The residual conversion gas, relaxed by the expander unit 21, is catalytically burned in a catalytic burner unit 27, together with the cathode waste gas which is fed by way of the cathode waste gas line 14. In a burner waste gas expander unit 28 connected to the output of the catalytic burner 27, the resulting hot burner waste gas is relaxed, and its energy is converted into mechanical energy, which is used to drive both a mechanically coupled cathode air pump 29, and a mechanically coupled reactor air pump 30. If the energy supplied by the expander unit 28 is not sufficient for this purpose, additional energy is supplied by a coupled driving motor 31. The expander unit 28 relaxes the burner waste gas from a pressure of, for example, 2.4 bar to a pressure of, for example, 1 bar. The cathode air pump 29 compresses air taken in from the atmosphere to a desired pressure of, for example, 2.6 bar, while the serially connected reactor air pump 30 withdraws a portion of the air compressed by the cathode air pump 29 from the cathode air feed line 11 and compresses it to a higher pressure (for example, 12 bar). Thereafter, a desired quantity of the air compressed in this manner is fed via a reactor air feed line 32 into the autothermal reactor 6.

Figure 2:
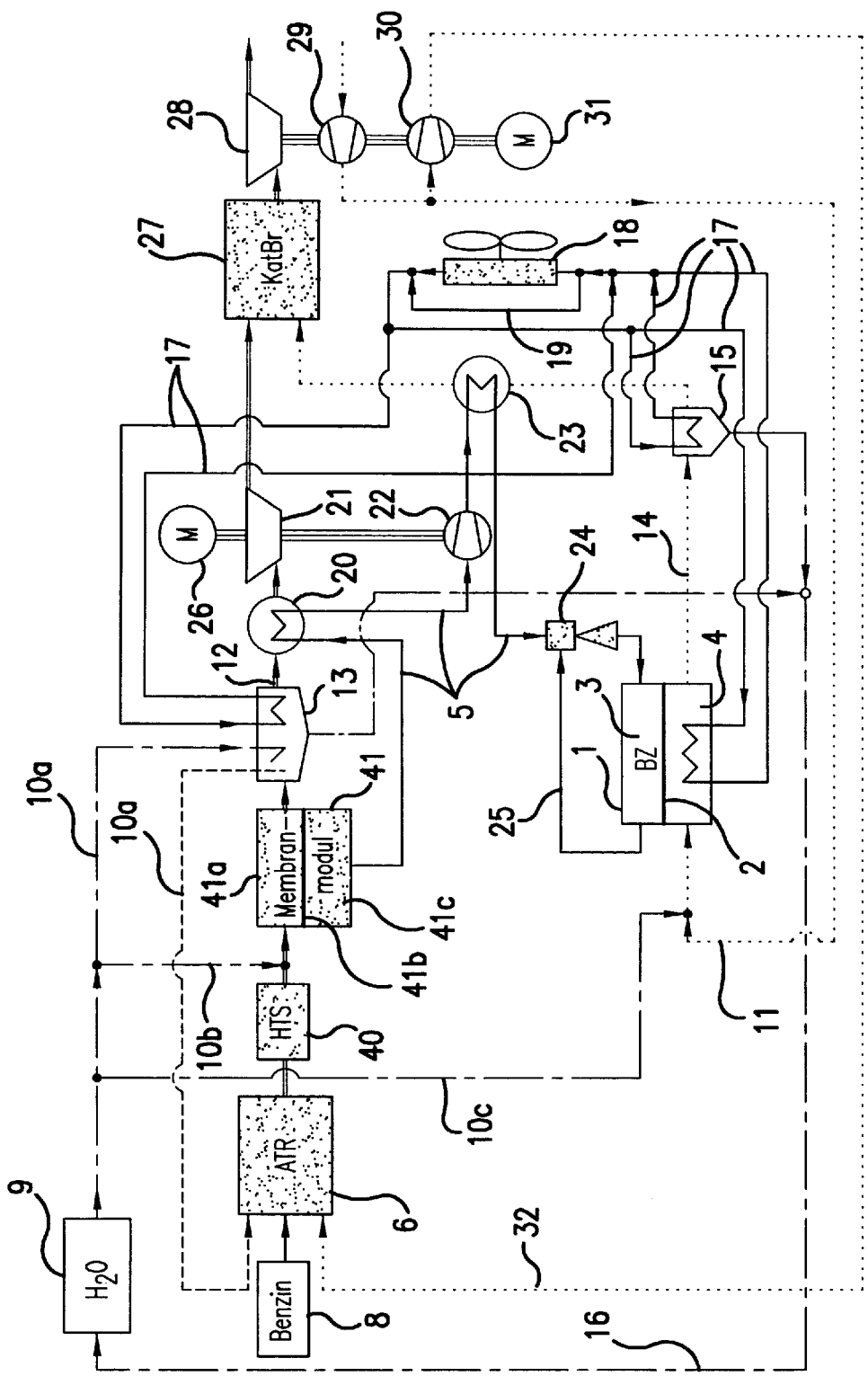
FIG. 2 is a block diagram of a fuel cell system having a serially connected hydrogen generating arrangement, an autothermal reactor, a high-temperature shift reactor unit and a hydrogen separating stage.

FIG. 2 shows a variant of the fuel cell system of FIG. 1 which differs from the latter essentially only in that, instead of the membrane reactor 7 of FIG. 1, two gas purification stages are connected behind the autothermal reactor 6, specifically a high-temperature shift reactor unit 40 and a process gas separating stage 41. In contrast to the cooled membrane reactor unit 7 of FIG. 1, the high-temperature shift reactor unit 40 is designed for implementing a water gas shift reaction in a higher temperature range which corresponds to (or is slightly below) the temperature level in the autothermal reactor 6, so that the high-temperature shift reactor unit 40 need not be cooled.

The water required for the high-temperature shift reaction is provided by feeding water via the first water feeding branch 10a into the autothermal reactor 6 at a corresponding excess. (Alternatively, it can also be fed by way of another water feed branch, which in that case is provided, directly into the high-temperature shift reactor unit 40).

The product gas separating stage 41 connected downstream contains a hydrogen separating membrane 41b which separates a gas mixture space 41a connected to the high-temperature shift reactor unit 40 from a hydrogen collecting space 41c. Essentially only hydrogen can flow via the membrane 41b from the gas mixture space 41 into the hydrogen collecting space 41c as the product gas to be fed to the fuel cell anode 3. Preferably, the gas mixture space 41a is also designed to carry out a supplementary low-temperature shift reaction, in order to convert carbon monoxide (which may still be contained in the output gas flow of the high-temperature shift reactor unit 40) to carbon dioxide and additional hydrogen, by means of water. For this purpose, the required water which is apportioned by way of the second water feed branch 10b simultaneously cools the gas mixture fed to the gas mixture space 41a, to a temperature level which is suitable for the low-temperature shift reaction. The branch of the cooling circulation system 17 which cools the membrane reactor 7 of FIG. 1 can be eliminated in this case. Otherwise, the system of FIG. 2 has the same construction and the same method of operation as that of FIG. 1, so that reference can be made in this respect to the above description of FIG. 1.

Figure 3:
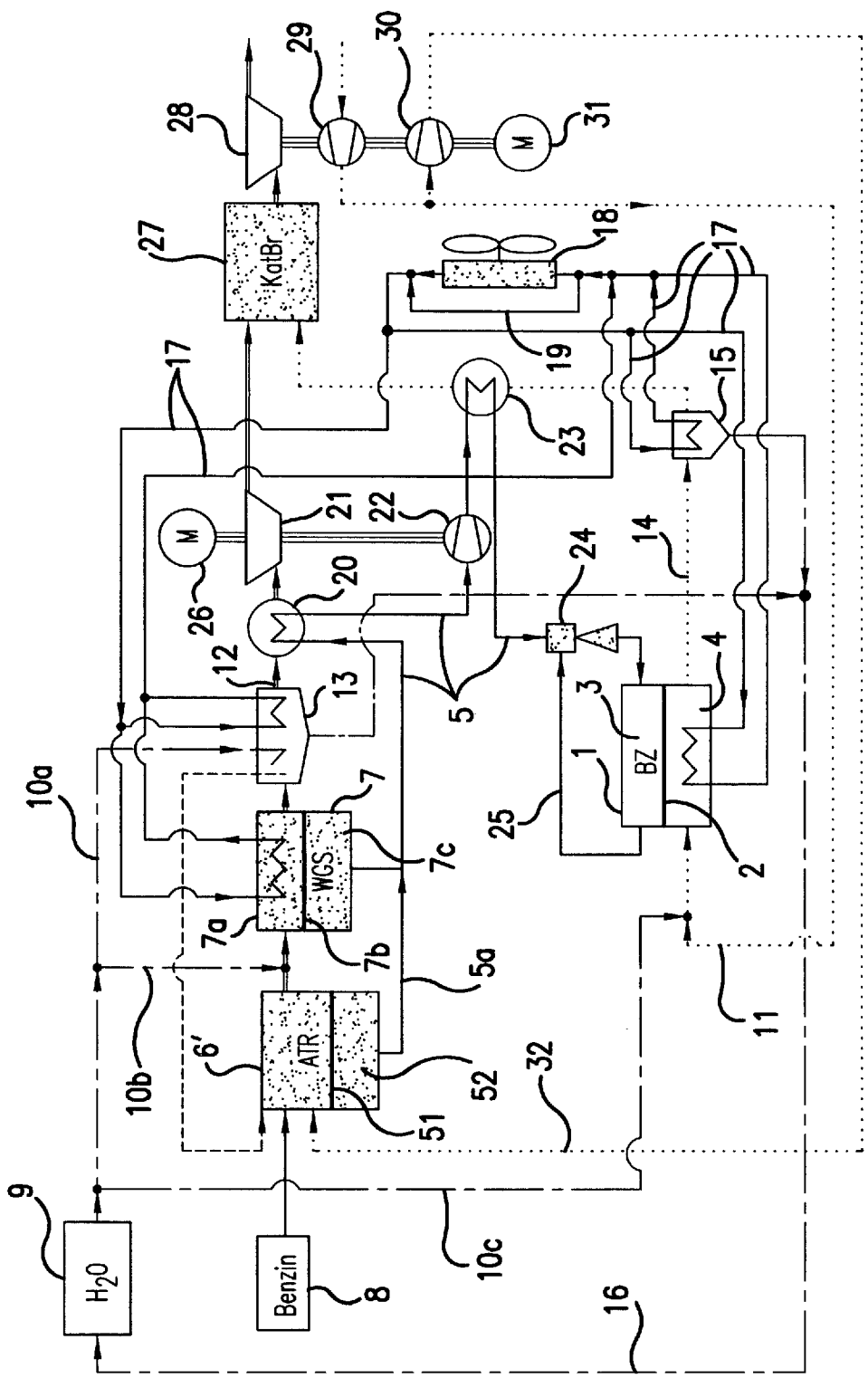
FIG. 3 is a block diagram of a fuel cell system having a hydrogen generating arrangement, which contains an autothermal reactor and a water gas shift reactor unit connected on the output side, each having a hydrogen separating membrane.

FIG. 3 shows another fuel cell system which is slightly modified with respect to that of FIG. 1, in which again functionally identical elements are provided with the same reference numbers. The system of FIG. 3 corresponds to that of FIG. 1, except that it uses an autothermal reactor 6' with a product gas separating stage integrated therein.

A boundary wall of the conversion reaction space of the autothermal reactor 6' is formed by a hydrogen separating membrane 51, which is adjoined on its other side by a hydrogen collecting space 52. Hydrogen formed in the reaction space of the autothermal reactor 6' can therefore be separated directly and selectively and arrives as product gas in the hydrogen collecting space 52, and thence by way of an additional connecting branch 5a in the product gas line 5. The gas mixture constituents which have not been separated in the autothermal reactor 6' arrive in the reaction space 7a of the membrane reactor unit 7 which is connected on the output side. As in the case of the system of FIG. 1, the membrane reactor unit 7 operates as a cooled low-temperature shift reactor stage to convert carbon monoxide contained in the gas mixture to carbon monoxide (with the additional formation of hydrogen), and to withdraw the additionally formed hydrogen by way of the separating membrane 7b into the pertaining hydrogen collecting space 7c. From there the hydrogen is guided, together with the hydrogen separated in the autothermal reactor 6' and possible slight impurities, as product gas consisting essentially of hydrogen, by way of the product gas line 5 to the fuel cell anode 3. The direct separation of hydrogen from the conversion reaction space of the autothermal reactor 6' has the advantage that the reaction balance can be shifted in favor of an additional formation of hydrogen, there as well as in the separation stage 7 connected on the output side. Otherwise, the system of FIG. 3 corresponds completely to that of FIG. 1.

Figure 4:
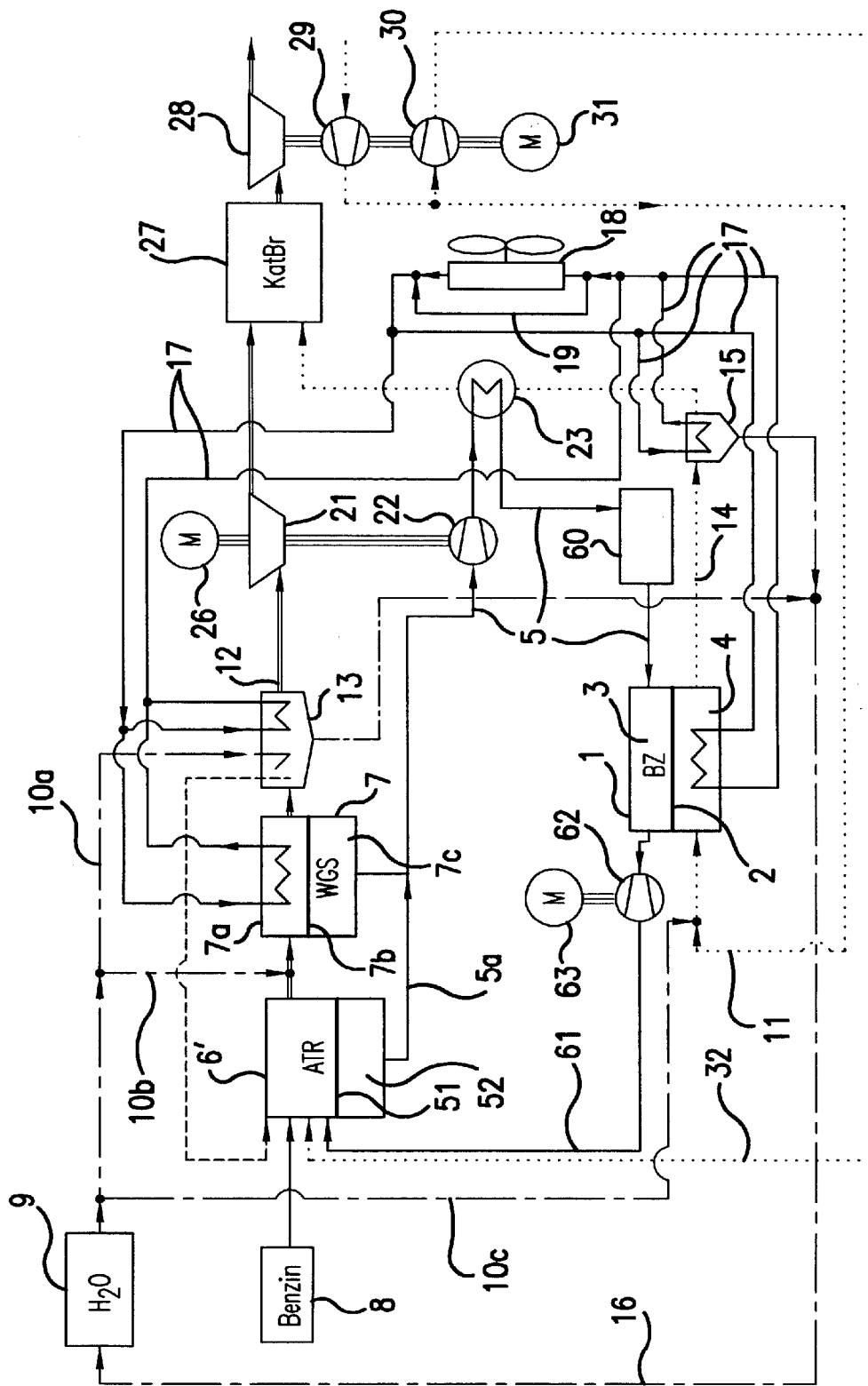
FIG. 4 is a block diagram of a fuel cell system corresponding to FIG. 3, but with an additional gas purification stage in a product gas feed line to the fuel cell anode.

FIG. 4 illustrates a fuel cell system which is modified with respect to that of FIG. 3; (functionally identical elements again being provided with the same reference numbers). The system of FIG. 4 differs from that of FIG. 3, on the one hand, in that a gas purification stage 60 is provided in the product gas line 5 in front of the fuel cell anode 3. The gas purification stage 60 is converts constituents such as CO, which are harmful to the fuel cell anode 3, and which may remain in the fed product gas. It is designed appropriately for this purpose, for example, as a CO oxidation unit, as a methanizing unit for the CO conversion by a methanizing reaction, as another water gas shift reactor unit and/or as an additional hydrogen separating membrane unit. As a result of the additional gas purification stage 60, it is sufficient to design the separating membranes 7, 51 in the membrane reactor 7 and in the autothermal reactor 6' for a moderately high hydrogen selectivity. This arrangement helps to reduce expenditures in comparison with providing a very highly selective hydrogen separating membrane. Furthermore, in the system of FIG. 4, the separated product gas is not in thermal contact with the residual conversion gas, so that the first heat exchanger 20 of the system of FIG. 3 can be eliminated.

In addition, in the system of FIG. 4, while the anode waste gas is returned to the anode inlet side as in the case of the other illustrated systems, it is introduced by way of an anode waste gas line 61 into the conversion reaction space of the autothermal reactor 6'. An anode waste gas compressor 62, which is driven by a motor 63, compresses the anode waste gas, as required for feeding it into the autothermal reactor 6'. As an alternative, one of the two expander units 21, 28 can help to drive the anode waste gas compressor 62. Otherwise, with respect to its construction and method of operation, the system of FIG. 4 corresponds completely to that of FIG. 3. It is understood that, as an alternative, one portion of the anode waste gas can be fed to the hydrogen generating arrangement, and one portion can be returned to the anode inlet side; for this purpose, a suitable controllable valve will then be provided for the desired distribution of the anode waste gas flow.

The illustrated embodiments indicate that the fuel cell system according to the invention has an optimal water balance. That is, it permits easy, virtually complete recovery of the process water, thus facilitating the use of the system particularly for mobile applications, as in fuel cells. As a result of the diverse gas purification measures, the hydrogen generating arrangement can provide a product gas as a fuel for the fuel cell anode, which can be formed by hydrogen of a purity greater than 99.99999%. Carbon monoxide, which is harmful to the anode is sufficiently removed so that damage to fuel cells is avoided.

The operation of one or several fuel cells, for example, of the PEM type, by means of such a highly pure hydrogen permits a high system efficiency. A high conversion rate of the used hydrocarbon or hydrocarbon derivative starting substance, such as gasoline, natural gas or methanol, also contributes to this high efficiency.

The fuel cell system according to the invention can also be constructed in a comparatively simple and compact manner, so that particularly the requirements for the installation in fuel cell powered vehicles can be met. In addition, very good dynamics exist under fluctuating load conditions, without the use of high-expenditure automatic control and control units. This also results in a good cold start capacity.

The system according to the invention also has a relatively long useful life, low sensitivity to contamination and thus a good sulfur tolerance. Finally, it can be manufactured in large numbers at comparatively low cost.

It is understood that, in addition to the illustrated implementations, other implementations of the system according to the invention are conceivable. Thus, according to the application, one of the two condensers and/or the cooling circulation system and/or the catalytic burner and/or one or both expander units may be eliminated. In addition, instead of the illustrated hydrogen generating arrangement, any other conventional hydrogen generating arrangement can be used, particularly one without a selective hydrogen separating stage. In this case, the product gas generated by the hydrogen generating arrangement, without a selective hydrogen separation, is fed directly or preferably by way of one or several gas purification stages, such as a CO oxidation stage or a water gas shift reaction unit, to the fuel cell anode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fuel cell system comprising:
   at least one fuel cell;
   a hydrogen generating unit for feeding an anode chamber of the at least one fuel cell with a hydrogen-rich product gas, by a conversion reaction of a hydrocarbon or hydrocarbon derivative starting substance and water, said hydrogen generating unit comprising at least one hydrogen separating membrane for selective separation of hydrogen-rich product gas from residual conversion gas;
   a water feeding system for supplying water to said hydrogen generating unit;
   at least one water recovery device comprising a first condenser for condensing water out of the residual conversion gas and a second condenser for condensing water out of waste gas of a fuel cell cathode; and
   a common cooling circulation system for the first and second condensers.

2. Fuel cell system according to claim 1, wherein
   the hydrogen generating unit includes a conversion reactor unit and a water gas shift reactor unit connected in sequence; and
   the water feeding system has at least one of a water feed line for the conversion reactor unit, a water feed line for the water gas shift reactor unit, and a water feed line for the fuel cell cathode.

3. Fuel cell system according to claim 2, wherein the water feed line for the conversion reactor unit, for heating the water guided through, is guided by way of the residual conversion gas water condenser.

4. Fuel cell system according to claim 1, further comprising at least one of:
   a first heat exchanger, in which the selectively separated hydrogen-containing product gas is in thermal contact with the residual conversion gas downstream of the residual conversion gas water condenser; and
   a second heat exchanger.

5. Fuel cell system according to claim 1, further comprising:
   a residual conversion gas expander unit situated in the residual conversion gas flow; and
   a product gas pump unit which is mechanically coupled with the expander unit and is situated in separated, hydrogen-containing product gas flow.

6. Fuel cell system according to one of claim 1, further comprising at least one of:
   a mixer unit for apportioning anode waste gas to the separated hydrogen-containing product gas; and
   an anode waste gas line for feeding anode waste gas to the hydrogen generating arrangement.

7. Fuel cell system according to claim 1, further comprising:
   a catalytic burner unit to which the residual conversion gas and the cathode waste gas are fed; and
   a burner waste gas expander unit connected on the output side of the catalytic burner unit; and
   a pump unit mechanically coupled to the burner waste gas expander unit, for feeding air to at least one of the fuel cell cathode and to the hydrogen generating unit.

* * * * *